US011132809B2

(12) United States Patent
Lee et al.

(10) Patent No.: US 11,132,809 B2
(45) Date of Patent: Sep. 28, 2021

(54) STEREO MATCHING METHOD AND APPARATUS, IMAGE PROCESSING APPARATUS, AND TRAINING METHOD THEREFOR

(71) Applicant: Samsung Electronics Co., Ltd., Suwon-si (KR)

(72) Inventors: Wonhee Lee, Hwaseong-si (KR); Hyun Sung Chang, Seoul (KR); Young Hun Sung, Hwaseong-si (KR); KyungBoo Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 15/718,820

(22) Filed: Sep. 28, 2017

(65) Prior Publication Data

US 2018/0211401 A1    Jul. 26, 2018

(30) Foreign Application Priority Data

Jan. 26, 2017  (KR) .......................... 10-2017-0012468

(51) Int. Cl.
*G06K 9/00* (2006.01)
*G06T 7/593* (2017.01)
(Continued)

(52) U.S. Cl.
CPC ............ *G06T 7/593* (2017.01); *G06K 9/4619* (2013.01); *G06K 9/6202* (2013.01); *G06K 9/4652* (2013.01); *G06K 9/4661* (2013.01); *G06T 2207/20084* (2013.01); *G06T 2207/20228* (2013.01)

(58) Field of Classification Search
CPC .......... G06T 7/593; G06T 2207/20084; G06T 2207/20228; G06K 9/6202; G06K 9/4619; G06K 9/4661; G06K 9/4652
See application file for complete search history.

(56) References Cited

U.S. PATENT DOCUMENTS 10,764,561 B1 *  9/2020  Devitt ................. H04N 13/271
2008/0165280 A1 *  7/2008  Deever ................ H04N 7/0132
                                                          348/497

(Continued)

FOREIGN PATENT DOCUMENTS

KR    10-2016-0035740 A    4/2016
KR    10-2016-0046670 A    4/2016

OTHER PUBLICATIONS

Jure Zbontar Stereo Matching by Training a Convolutional Neural Network to Compare Image Patches, (Year: 2016).*

(Continued)

*Primary Examiner* — Solomon G Bezuayehu
(74) *Attorney, Agent, or Firm* — NSIP Law

(57) ABSTRACT

A stereo matching method includes obtaining a first feature map associated with a first view image and a second feature map associated with a second view image using a neural network model-based feature extractor, determining respective matching costs between a reference pixel of the first view image and candidate pixels of the second view image using the first feature map and the second feature map, and determining a pixel corresponding to the reference pixel among the candidate pixels based on the determined matching costs.

16 Claims, 9 Drawing Sheets

(51) Int. Cl.
*G06K 9/46* (2006.01)
*G06K 9/62* (2006.01)

(56) References Cited

U.S. PATENT DOCUMENTS

| | | | | |
|---|---|---|---|---|
| 2009/0304293 | A1* | 12/2009 | Chang | H04N 19/533 |
| | | | | 382/236 |
| 2010/0149381 | A1* | 6/2010 | Motomura | H04N 9/045 |
| | | | | 348/235 |
| 2010/0201888 | A1* | 8/2010 | Peng | H04N 7/0112 |
| | | | | 348/699 |
| 2011/0170065 | A1* | 7/2011 | Sugio | A61B 5/398 |
| | | | | 351/209 |
| 2014/0002605 | A1* | 1/2014 | Liao | G06T 5/005 |
| | | | | 348/46 |
| 2014/0003704 | A1* | 1/2014 | Liao | G06T 7/13 |
| | | | | 382/154 |
| 2014/0219549 | A1* | 8/2014 | Choi | G06T 7/593 |
| | | | | 382/154 |
| 2015/0125049 | A1 | 5/2015 | Taigman et al. | |
| 2015/0269737 | A1* | 9/2015 | Lam | H04N 13/128 |
| | | | | 382/154 |
| 2015/0332447 | A1* | 11/2015 | Choi | G06T 3/4007 |
| | | | | 382/154 |
| 2015/0379728 | A1* | 12/2015 | Conze | H04N 19/537 |
| | | | | 382/107 |
| 2016/0037121 | A1 | 2/2016 | Chang et al. | |
| 2016/0048556 | A1* | 2/2016 | Kelly | G06Q 30/02 |
| | | | | 707/767 |
| 2016/0106321 | A1 | 4/2016 | Sharma et al. | |
| 2016/0247290 | A1* | 8/2016 | Liu | G06K 9/00791 |
| 2016/0307334 | A1* | 10/2016 | Dos Santos Mendonca | |
| | | | | G06K 9/46 |
| 2017/0223333 | A1* | 8/2017 | Zou | H04N 13/106 |

OTHER PUBLICATIONS

J. Du et al., "Synthesized Stereo Mapping Via Deep Neural Networks for Noisy Speech Recognition," *Proceedings from the IEEE International Conference on Acoustic, Speech and Signal Processing (ICASSP),* May 2014, pp. 1783-1787.

Z. Chen, et al., "A Deep Visual Correspondence Embedding Model for Stereo Matching Costs," *Proceedings of the IEEE International Conference on Computer Vision,* Dec. 2015, pp. 972-980.

J. Žbontar, et al., "Stereo Matching by Training a Convolutional Neural Network to Compare Image Patches," *Journal of Machine Learning Research,* vol. 17, Issue 1, Jan. 2016, pp. 1-32.

C. Ding, et al., "A Comprehensive Survey on Pose-Invariant Face Recognition," *Journal ACM Transactions on Intelligent Systems and Technology (TIST)—Regular Papers, Survey Papers and Special Issue on Recommender System Benchmarks,* vol. 7, Issue 3, Apr. 2016, pp. 1-40.

Wang, Jung-Hua et al., "On Disparity Matching in Stereo Vision via a Neural Network Framework." *Proceedings of the National Science Council Republic of China Part a Physical Science and Engineering,* vol. 23, No. 5, Oct. 1999, (pp. 665-678).

Luo, Wenjie, et al., "Efficient Deep Learning for Stereo Matching." *Proceedings of the IEEE Conference on Computer Vision and Pattern Recognition (CVPR),* Jun. 2016 (pp. 5695-5703).

Li, Vladimir. "Evaluation of the CNN Based Architectures on the Problem of Wide Baseline Stereo Matching." *KTH Royal Institute of Technology, School of Computer Science and Communication,* Master Thesis, Oct. 2016 (60 pages in English).

Extended European search Report dated Jan. 23, 2018 in corresponding European Application No. 17202367.3 (6 pages in English).

* cited by examiner

STEREO MATCHING METHOD AND APPARATUS, IMAGE PROCESSING APPARATUS, AND TRAINING METHOD THEREFOR

CROSS-REFERENCE TO RELATED APPLICATIONS

This application claims the benefit under 35 USC 119(a) of Korean Patent Application No. 10-2017-0012468 filed on Jan. 26, 2017, in the Korean Intellectual Property Office, the entire disclosure of which is incorporated herein by reference for all purposes.

BACKGROUND

1. Field

The following description relates to image processing technology.

2. Description of Related Art

Stereo matching is a method used to obtain depth information from a two-dimensional (2D) image. The stereo matching detects corresponding points from at least two images, and estimates a depth of an object from the images based on the corresponding points. A same object captured from different views is present in a stereo image. Due to a binocular disparity, a large displacement difference between images of the stereo image is generated when the object is located closer to a camera, and a small displacement difference between the images is generated when the object is located farther from the camera. A depth to the object may be calculated based on a disparity, which is a distance difference between pixels in one view image and corresponding pixels in another view image.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a stereo matching method includes obtaining a first feature map associated with a first view image and a second feature map associated with a second view image using a neural network model-based feature extractor; determining respective matching costs between a reference pixel of the first view image and candidate pixels of the second view image using the first feature map and the second feature map; and determining a pixel corresponding to the reference pixel among the candidate pixels based on the determined matching costs.

The first feature map may include a feature vector of the reference pixel, the second feature map may include respective feature vectors of the candidate pixels, and the determining of the respective matching costs may include determining the matching costs based on respective differences between the feature vector of the reference pixel and the respective feature vectors of the candidate pixels.

The determining of the pixel may include determining, to be the pixel corresponding to the reference pixel, a candidate pixel having a lowest matching cost among the candidate pixels.

The feature extractor may be configured to receive image information of the first view image as an input, determine a feature vector of the reference pixel based on the input image information, and generate the first feature map based on the feature vector of the reference pixel.

The feature extractor may be configured to receive image information of the second view image as an input, determine respective feature vectors of the candidate pixels based on the input image information, and generate the second feature map based on the respective feature vectors of the candidate pixels.

The obtaining of the first feature map and the second feature map may include obtaining the first feature map based on a patch region of the first view image, and obtaining the second feature map based on patch regions of the second view image.

The feature extractor may be configured to receive, as an input, information of a patch region including the reference pixel of the first view image, determine a feature vector of the reference pixel based on the input information of the patch region, and generate the first feature map based on the feature vector of the reference pixel.

The feature extractor may be further configured to receive, as the input, any one or any combination of any two or more of intensity information, color information, and gradient information of pixels included in the patch region including the reference pixel.

The feature extractor may be configured to receive, as an input, information of patch regions respectively including the candidate pixels of the second view image, determine respective feature vectors of the candidate pixels based on the input information of the patch regions, and generate the second feature map based on the respective feature vectors of the candidate pixels.

The feature extractor may be further configured to receive, as the input, any one or any combination of any two or more of intensity information, color information, and gradient information of pixels included in the patch respectively including the candidate pixels.

The first feature map may include information about a feature vector of each of pixels included in the first view image, and the second feature map may include information about a feature vector of each of pixels included in the second view image.

The candidate pixels may be pixels located on a line including a point in the second view image corresponding to the reference pixel of the first view image.

The determining of the respective matching costs may include determining an initial matching cost between the reference pixel and a current candidate pixel; and adjusting the initial matching cost based on matching cost information associated with another reference pixel adjacent to the reference pixel.

The stereo matching may further include determining depth information based on a disparity between the reference pixel and the pixel corresponding to the reference pixel.

In another general aspect, a non-transitory computer-readable medium stores instructions that, when executed by a processor, cause the processor to perform the method described above.

In another general aspect, a stereo matching method includes extracting a first feature vector of a reference pixel included in a first view image and respective second feature vectors of each of candidate pixels included in a second view image using a neural network model-based feature extractor; and determining a pixel corresponding to the reference pixel among the candidate pixels based on respective vector between the extracted first feature vector and each of the extracted second feature vectors.

In another general aspect, a transformation parameter estimating method includes extracting feature points from a first image and a second image obtained at different times; determining respective first feature vectors of feature points of the first image and respective second feature vectors of feature points of the second image using a neural network model-based feature extractor; determining a feature point pair of corresponding feature points in the first image and the second image based on the first feature vectors and the second feature vectors; and estimating a transformation parameter based on a location difference between the corresponding feature points of the feature point pair.

The feature extractor may be configured to receive, as an input, information about a patch region including a feature point of the first image or the second image, and determine a feature vector of the feature point based on the input information.

In another general aspect, an image processing apparatus includes a processor configured to obtain a first feature map associated with a first view image and a second feature map associated with a second view image using a neural network model-based feature extractor, determine respective matching costs between a reference pixel of the first view image and candidate pixels of the second view image using the first feature map and the second feature map, and determine a pixel corresponding to the reference pixel among the candidate pixels based on the determined matching costs.

The first feature map may include a feature vector of the reference pixel, the second feature map may include respective feature vectors of the candidate pixels, and the processor may be further configured to determine the matching costs based on respective distances between the feature vector of the reference pixel and the respective feature vectors of the candidate pixels.

In another general aspect, a training method of a stereo matching apparatus that includes a neural network model-based feature extractor includes inputting a reference patch region including a reference pixel of a first view image to a first neural network model of a triplet neural network model to obtain a first feature vector of the reference pixel, the triplet neural network model including three neural network models sharing parameters; inputting an inlier patch region including a true candidate pixel of a second view image corresponding to the reference pixel of the first view image to a second neural network model of the triplet neural network to obtain a second feature vector of the true candidate pixel; inputting an outlier patch region including a false candidate pixel of the second view image not corresponding to the reference pixel of the first view image to a third neural network model of the triplet neural network to obtain a third feature vector of the false candidate pixel; calculating a first distance between the first feature vector and the second feature vector; calculating a second distance between the first feature vector and the third feature vector; training the first, second, and third neural network models to reduce the first distance and increase the second distance; and applying one of the trained first, second, and third neural network models to the neural network model-based feature extractor of the stereo matching apparatus.

The reference patch region may further include pixels of the first view image surrounding the reference pixel of the first view image; the inlier patch region may further include pixels of the second view image surrounding the true candidate pixel of the second view image; and the outlier patch region may further include pixels of the second view image surrounding the false candidate pixel of the second view image.

The training method may further include repeating the calculating of the first distance, the calculating of the second distance, and the training of the first, second, and third neural network models until the first distance is substantially equal to 0.

Each of the first, second, and third neural network models may include a convolution layer; and a rectified linear unit (ReLU) layer having an input connected to an output of the convolution layer.

Each of the first, second, and third neural network models may further include N sets of the convolution layer and the rectified linear unit (ReLU) layer, within each of the N sets, the input of the rectified linear unit (ReLU) layer may be connected to the output of the convolution layer, and the N sets may be connected in series so that an input of the convolution layer of a first set of the N sets is connected to an input of a corresponding one of the first, second, and third neural network models, an input of the convolution layer of each of a second set through an N-th set of the N sets is connected to an output of the rectified linear unit (ReLU) layer of a previous one of the N sets, and an output of the rectified linear unit (ReLU) layer of the N-th set of the N sets is connected to an output of the corresponding one of the first, second, and third neural network models.

Other features and aspects will be apparent from the following detailed description, the drawings, and the claims.

BRIEF DESCRIPTION OF THE DRAWINGS

Throughout the drawings and the detailed description, the same drawing reference numerals refer to the same elements. The drawings may not be to scale, and the relative size, proportions, and depiction of elements in the drawings may be exaggerated for clarity, illustration, and convenience.

DETAILED DESCRIPTION

Figure 1:
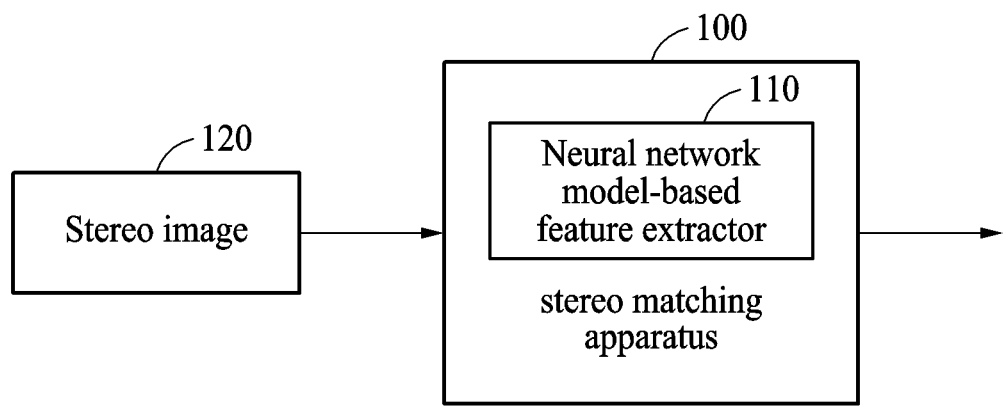
FIG. 1 is a diagram illustrating an example of an operation of a stereo matching apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), and (b) may be used herein to describe components. Each of these terms is not used to define an essence, order, or sequence of a corresponding component, but is used merely to distinguish the corresponding component from other component(s). For example, a first component may instead be referred to as a second component, and similarly the second component may instead be referred to as the first component.

If the specification states that one component is "connected," "coupled," or "joined" to another component, a third component may be "connected," "coupled," and "joined" between the first and second components, or the first component may be directly connected, coupled, or joined to the second component without a third component being present therebetween. In addition, if the specification states that one component is "directly connected" or "directly joined" to another component, a third component cannot be present therebetween. Likewise, expressions such as "between" and "immediately between" and "adjacent to" and "immediately adjacent to" are to be construed in an analogous manner.

The terminology used herein is for the purpose of describing particular examples only, and is not to be used to limit the disclosure. The singular forms "a," "an," and "the" include the plural forms as well, unless the context clearly indicates otherwise. The terms "comprises," "comprising," "includes," and "including" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 is a diagram illustrating an example of an operation of a stereo matching apparatus.

Referring to the example of FIG. 1, a stereo matching apparatus 100 receives a stereo image 120, and determines depth information based on the stereo image 120. The stereo image 120 includes different view images, for example, a left image and a right image, that are obtained from at least two cameras. The view images are captured at different locations or from different views or viewpoints at a same time. The stereo image 120 may be obtained by, for example, a stereo camera.

In another example, the stereo matching apparatus 100 determines the depth information based on a multiview image including at least three different view images. For convenience of description, an example of a stereo image including two different view images will be described.

The stereo matching apparatus 100 detects a pixel pair of corresponding pixels in the stereo image 120, and determines depth information of an object and a background based on a disparity, which is a location difference between the corresponding pixels of the pixel pair. The depth information may be used to render a three-dimensional (3D) image, or estimate a distance from a camera view to the object or the background. In one example, depth information is used to estimate a distance to a vehicle or an obstacle present in front using a stereo camera in a navigation system of a vehicle. In another example, in an augmented reality (AR) image in which a real object and a virtual object are combined, depth information of the real object is used to determine a location in the image at which the virtual object is to be represented. The stereo matching apparatus 100 may be embodied by at least one hardware module, such as a processor.

The stereo matching apparatus 100 determines the depth information through stereo matching. The stereo matching includes extracting a feature of each of pixels included in the stereo image 120, and estimating a disparity by comparing features extracted from the stereo image 120 and detecting corresponding pixels. For example, the stereo matching apparatus 100 detects a pixel in a right image that corresponds to a pixel included in a left image, or detects a pixel in the left image that corresponds to a pixel included in the right image. To detect such corresponding pixels, the stereo matching apparatus 100 uses intensity information, color information, or gradient information of a pixel, or a combination of any two or more thereof. The stereo matching apparatus 100 determines the disparity based on a difference in terms of a location, or a location difference, between the detected corresponding pixels. Hereinafter, either one of the left image and the right image will be referred to as a first view image, and the other one will be referred to as a second view image.

The stereo matching apparatus 100 performs the stereo matching using a neural network model-based feature extractor 110. As a neural network model, a deep neural network (DNN) model including a plurality of layers may be used. Using the feature extractor 110 makes it possible to estimate a feature of an image accurately and rapidly. The neural network model is a statistical model that is modeled after a characteristic of a biological neural network. The neural network model has an ability to solve an issue by outputting a desired result from input information. To enhance such an ability, the neural network model performs a training or learning process on artificial neurons or nodes that form a neural network through synaptic connection. Through the training process, parameter values that form the neural network model may be corrected more desirably.

The stereo matching apparatus 100 extracts a feature, or a feature vector, of each of pixels in each view image using the feature extractor 110, and determines a similarity between pixels to be used to determine corresponding pixels through a feature distance calculation. The stereo matching apparatus 100 reduces a calculation complexity, or a computational complexity, while maintaining a high accuracy by extracting a feature of a view image more accurately and rapidly using the neural network model and determining a similarity between extracted features using the feature distance calculation with a relatively low computational complexity. Thus, the stereo matching may be performed accurately and rapidly.

Hereinafter, a stereo matching method performed by the stereo matching apparatus 100 will be described in detail with reference to FIGS. 2 through 4.

Figure 2:
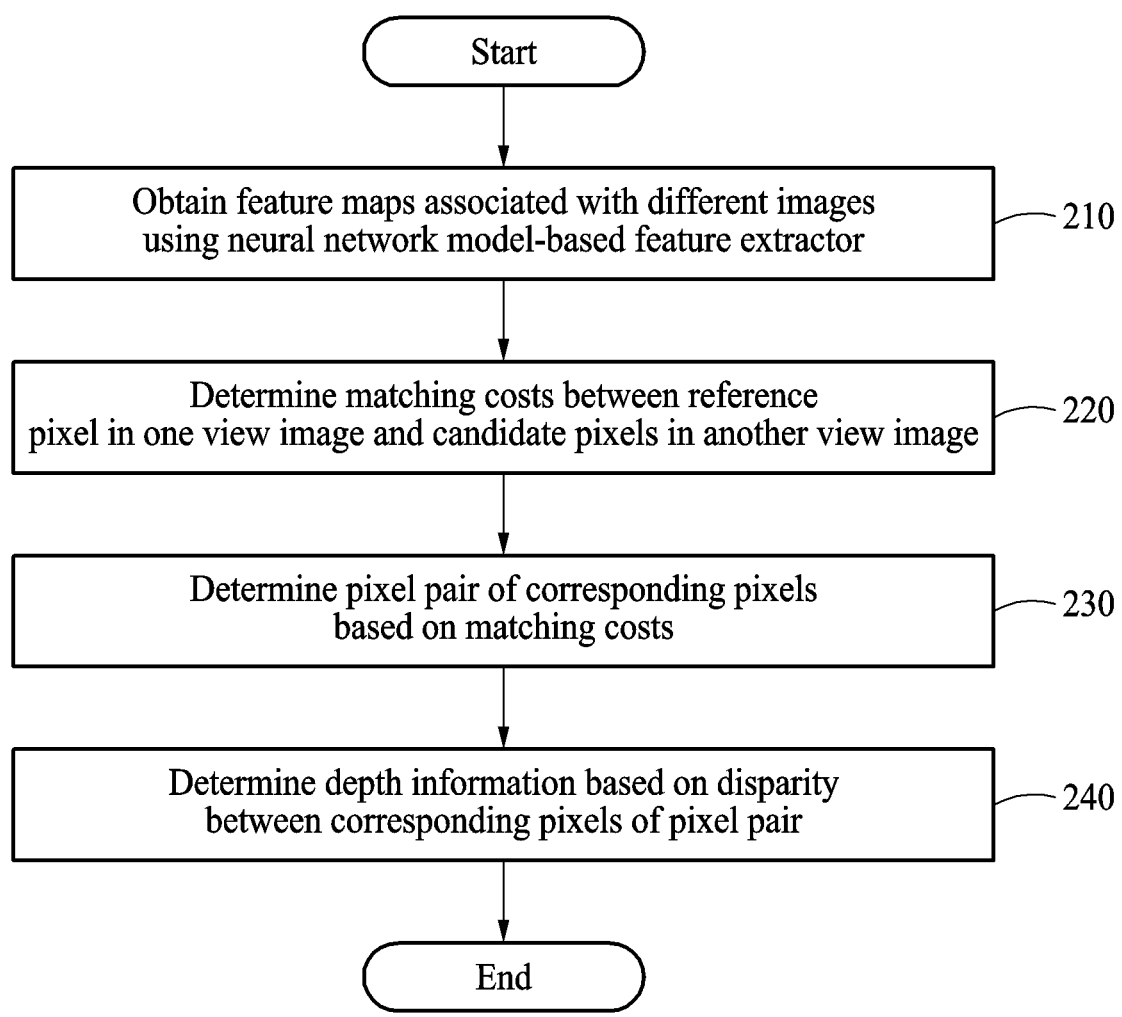
FIG. 2 is a flowchart illustrating an example of a stereo matching method.

FIG. 2 is a flowchart illustrating an example of a stereo matching method.

A stereo matching method to be described hereinafter with reference to FIG. 2 may be performed by the stereo matching apparatus 100 described with reference to FIG. 1, or an image processing apparatus 700 to be described with reference to FIG. 7. Referring to FIG. 2, in operation 210, the stereo matching apparatus obtains feature maps associated with different view images using a neural network model-based feature extractor. For example, the stereo matching apparatus extracts a first feature vector of each of pixels included in a first view image and a second feature vector of each of pixels included in a second view image using the feature extractor, and obtains a first feature map associated with the first view image and a second feature map associated with the second view image. The first feature map includes information about the first feature vector of each of the pixels included in the first view image, and the second feature map includes information about the second feature vector of each of the pixels included in the second view image.

In one example, the stereo matching apparatus obtains a feature map of a first view image acquired by an image unit. Image information of the first view image is input to the feature extractor. The feature extractor determines feature vectors forming the first feature map based on the input image information. The image information of the first view image may be pixel information of the pixels included in the first view image including, for example, intensity information, color information, or gradient information of the pixels, or a combination of any two or more thereof. When the image information of the first view image is input, the feature extractor determines a feature vector corresponding to each of the pixels included in the first view image. For example, the feature extractor determines a feature vector corresponding to a reference pixel of the first view image based on pixel information of pixels included in one portion, for example, a patch region, centered on the reference pixel. By performing such a method described in the foregoing on other pixels, the feature extractor determines the feature vector corresponding to each pixel included in the first view image. Similar to such a method in which the feature extractor determines the feature vectors forming the first feature map, image information of the second view image is input to the feature extractor, and the feature extractor determines feature vectors forming the second feature map based on the input image information of the second view image.

In another example, the stereo matching apparatus obtains a feature map based on patch regions. A patch region is a pixel region including a plurality of pixels, such as, for example, an 8×8 pixel block. The stereo matching apparatus obtains the first feature map based on patch regions of the first view image, and obtains the second feature map based on patch regions of the second view image. For example, information of a patch region centered on a reference pixel of the first view image is input to the feature extractor, and the feature extractor determines a feature vector of the reference pixel based on the input information of the patch region. Intensity information, color information, or gradient information of pixels included in the patch region, or a combination of any two or more thereof, is input to the feature extractor. A feature of the reference pixel is determined based on neighboring pixels, and thus a probability of the determined feature of the reference pixel having a more accurate value is increased. Similarly, information of a patch region centered on a candidate pixel of the second view image is input to the feature extractor, and the feature extractor determines a feature vector of the candidate pixel based on the input information of the patch region. Intensity information, color information, or gradient information of pixels included in the patch region, or a combination of any two or more thereof, is input to the feature extractor. The candidate pixel is a pixel of the second view image that is to be a target of comparison used to determine a pixel in the second view image corresponding to the reference pixel of the first view image. The candidate pixel may be a pixel located on a line including a point in the second view image that corresponds to the reference pixel of the first view image.

In operations 220 and 230, the stereo matching apparatus determines a pixel pair of corresponding pixels in the view images using the feature maps. The stereo matching apparatus uses a similarity between feature vectors to determine the pixel pair, and a matching cost between pixels is used as the similarity. The stereo matching apparatus determines, to be a pixel of the second view image corresponding to a reference pixel of the first view image, a pixel having an optimal matching cost among candidate pixels of the second view image.

In operation 220, the stereo matching apparatus determines matching costs between the reference pixel of the first view image and the candidate pixels of the second view image using the first feature map associated with the first view image and the second feature map associated with the second view image. The stereo matching apparatus calculates a difference, or a vector distance, between a feature vector of the reference pixel and a feature vector of each of the candidate pixels, and determines the matching costs based on the calculated difference. For example, the stereo matching apparatus calculates a Euclidean distance between the feature vectors as the difference between the feature vector of the reference pixel and the feature vector of each of the candidate pixels, and determines the matching costs based on the calculated Euclidean distance. The stereo matching apparatus normalizes the calculated Euclidean distance or applies a weight to the Euclidean distance. A matching cost may be proportional to a value of the Euclidean distance, or a large matching cost indicates a low similarity between two pixels, which are targets for comparison. Conversely, a small matching cost indicates a high similarity between the two pixels.

In another example, after a matching cost between the reference pixel and a candidate pixel is determined, the stereo matching apparatus performs matching cost optimization or matching cost aggregation. For example, in the case of matching cost optimization, the stereo matching apparatus determines an initial matching cost between the reference pixel and the candidate pixel, and adjusts the initial matching cost based on matching cost information of another reference pixel adjacent to the reference pixel. Such a method improves the accuracy of the matching cost and reduces an influence of erroneous information.

In local matching, matching cost aggregation may be mainly performed. In semi-global or global matching, matching cost optimization may be mainly performed. As necessary, in such a global method, matching cost aggregation may be performed before matching cost optimization is performed. Matching cost aggregation generally refers to a method of determining a new matching cost by aggregating matching costs of neighboring pixels of a single pixel p that are located within a predetermined range of the pixel p, and determining an aggregated matching cost AC(p, d) corresponding to a disparity d of the pixel p. In one example, the aggregated matching cost AC(p, d) is determined to be an average value of matching costs corresponding to disparities d of the neighboring pixels.

In operation 230, the stereo matching apparatus determines the pixel pair of the corresponding pixels between the first view image and the second view image based on the determined matching costs. The stereo matching apparatus determines, to be a pixel corresponding to the reference pixel, a candidate pixel of the second view image having an optimal matching cost among the candidate pixels of the second view image. For example, the stereo matching apparatus determines, to be the pixel corresponding to the reference pixel, a candidate pixel having a lowest matching cost among the candidate pixels.

By performing operations 220 and 230 on all the patch regions included in the first view image, pixel pairs of corresponding pixels between the first view image and the second view image may be determined.

In operation 240, the stereo matching apparatus determines depth information based on a disparity between the corresponding pixels of the pixel pair. In one example, the stereo matching apparatus determines depth information based on a disparity between the reference pixel and the pixel corresponding to the reference pixel, and generates a depth map based on the determined depth information. A disparity map including disparity information about a disparity between reference pixels included in the first view image and corresponding pixels included in the second view image may be used.

For example, the stereo matching apparatus determines a depth value from a disparity based on Equation 1 below.

$$Z = \frac{B \times f \times s}{d} \quad (1)$$

In Equation 1, Z denotes a depth value, B denotes a baseline, which is a distance between two cameras respectively capturing a first view image and a second view image, f denotes a camera focal length, d denotes a disparity, and s denotes a scaling element to determine a magnitude of the depth value, and has a preset value.

Figure 3:
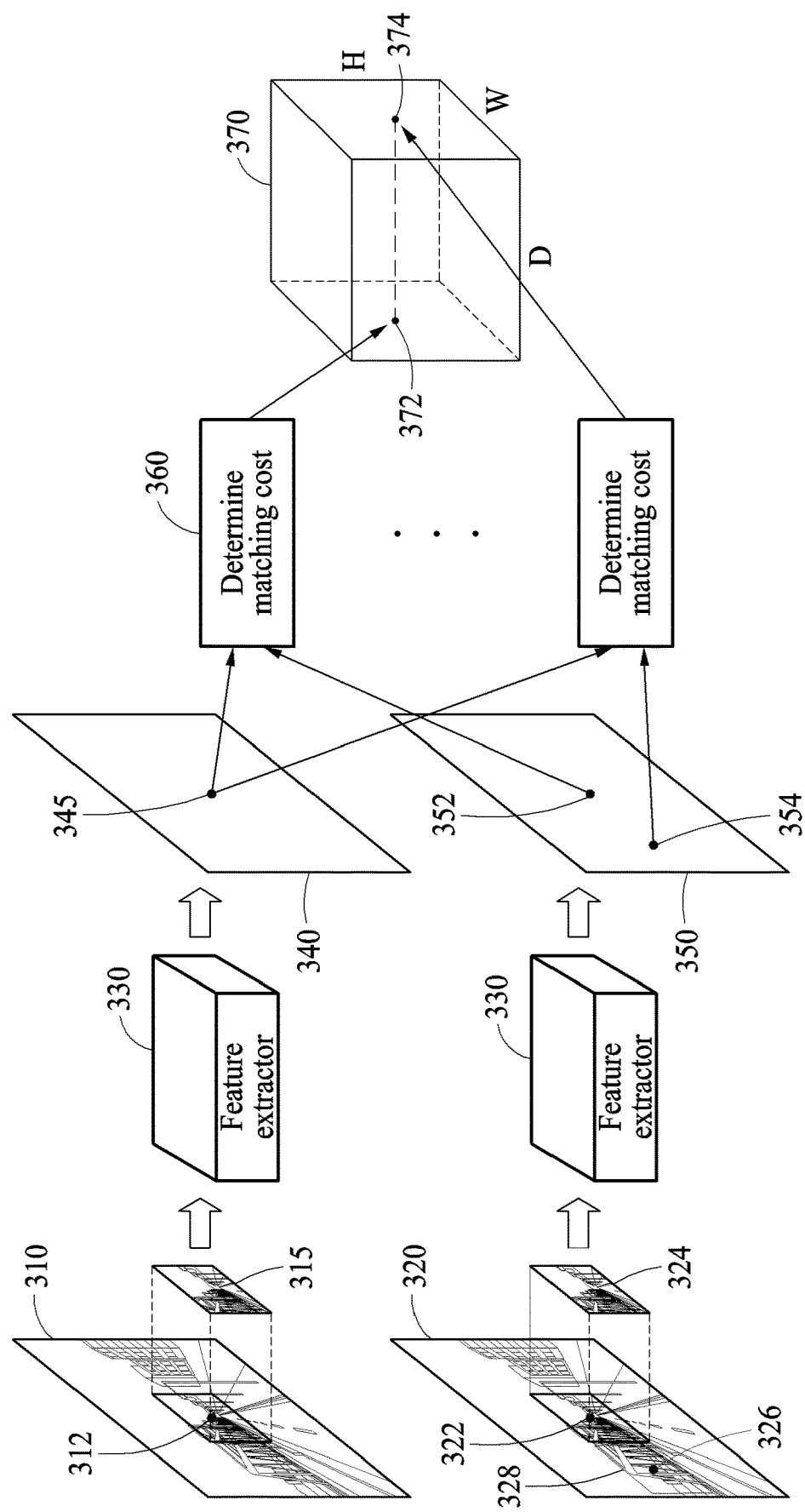
FIG. 3 is a diagram illustrating an example of a method of determining matching costs from different view images.

FIG. 3 is a diagram illustrating an example of a method of determining matching costs from different view images.

Referring to FIG. 3, a stereo matching apparatus extracts a feature from each of different view images using a neural network model-based feature extractor 330. Information about a patch region 315 including a pixel 312 of a first view image 310 is input to the feature extractor 330, and the feature extractor 330 extracts a feature vector corresponding to the pixel 312. In one example, pixel information including, for example, intensity information, color information, or gradient information of pixels in a patch region centered on each pixel included in the first view image 310, or a combination of any two or more thereof, is input to the feature extractor 330. The feature extractor 330 is trained in advance to output a feature vector corresponding to the patch region based on the input information of the patch region. When the feature vector 330 determines a feature vector of a patch region of each pixel included in the first view image 310, a first feature map 340 associated with the first view image 310 is obtained. The first feature map 340 includes feature vectors of pixels included in the first view image 310.

Similarly, information about a patch region 324 including a pixel 322 of a second view image 320 is input to the feature extractor 330, and the feature extractor 330 outputs a feature vector corresponding to the pixel 322. By performing such a method on all pixels included in the second view image 320, a second feature map 350 associated with the second view image 320 is obtained. The second feature map 350 includes feature maps of the pixels included in the second view image 320.

In one example, under the assumption that a width of each of the first view image 310 and the second view image 320 is W, and a height of each of the first view image 310 and the second view image 320 is H, a total number of pixels included in each of the first view image 310 and the second view image 320 is W×H. The stereo matching apparatus passes (2×W×H) patch regions through the feature extractor 330 to obtain the first feature map 340 and the second feature map 350.

In another example, information of an entire image area is input to the feature extractor 330, instead of information of a patch region being input to the feature extractor 330. For example, pixel information, or image information, of all the pixels included in the first view image 310 is input to the feature extractor 330, and the feature extractor 330 determines feature vectors forming the first feature map 340 based on the input image information. Similarly, pixel information, or image information, of all the pixels included in the second view image 320 is input to the feature extractor 330, and the feature extractor 330 determines feature vectors forming the second feature map 350 based on the input image information.

Through the method described above, the stereo matching apparatus generates the feature maps 340 and 350 corresponding respectively to the view images 310 and 320, and determines a pixel pair of corresponding pixels between the first view image 310 and the second view image 320 using the generated feature maps 340 and 350. For example, in operation 360 as illustrated in FIG. 3, the stereo matching apparatus determines a matching cost by comparing a feature vector of a pixel of the first view image 310 and a feature vector of a pixel of the second view image 320. The matching cost is used to estimate a similarity between pixels to be compared. For example, to estimate a similarity between the pixel 312 of the first view image 310 and the pixel 322 of the second view image 320, the stereo matching apparatus uses a Euclidean distance L2 or a Manhattan distance L1 between a feature vector 345 of the pixel 312 and a feature vector 352 of the pixel 322.

When determining the matching cost in operation 360, the stereo matching apparatus determines a matching cost between a reference pixel of the first view image 310 and each of candidate pixels of the second view image 320 corresponding to the reference pixel. Under the assumption that the pixel 312 is the reference pixel, the candidate pixels are determined among pixels of the second view image 320 that are located on a line including a point corresponding to a location of the pixel 312. For example, pixels present on a line in the second view image 320 that connects the pixel 322 and a pixel 326 are determined to be the candidate pixels. A feature vector 354 of the pixel 326 is also determined when information about a patch region 328 centered on the pixel 326 is input to the feature extractor 330.

The stereo matching apparatus calculates a matching cost between a single reference value and each of a plurality of candidate pixels. Based on a result of the calculating of the matching cost, a matching cost volume 370 is calculated. For example, the matching cost volume 370 is represented by a (D×W×H) dimensional matrix structure having the matching cost between the reference pixel and each of the candidate pixels as an element. In the matrix structure, W denotes a width of the first view image 310 and the second view image 320, H denotes a height of the first view image 310 and the second view image 320, and D denotes a search range, which corresponds to the number of the candidate pixels to be compared to the reference pixel. The stereo matching apparatus obtains the matching cost volume 370 through a matching cost calculation performed (D×W×H) times. For example, in the matching cost volume 370, a matching cost 372 is determined based on the feature vector 345 of the pixel 312 and the feature vector 352 of the pixel 322, and a matching cost 374 is determined based on the feature vector 345 of the pixel 312 and the feature vector 354 of the pixel 326. In the matching cost volume 370, matching costs between the pixel 312, which is the reference pixel, and candidate pixels present between the pixel 322 and the pixel 326 are present between the matching cost 372 and the matching cost 374 as elements of the matching cost volume 370.

The matching cost volume 370 is adjusted through matching cost optimization (or matching cost aggregation). Matching cost optimization ensures a continuity of matching costs between pixels to remove noise of the matching costs, and adjusts the matching costs so that pixels in a same region have similar matching costs. The matching cost optimization (or the matching cost aggregation) may be performed on all matching costs or locally performed.

The stereo matching apparatus determines, to be the pixel corresponding to the reference pixel, a candidate pixel among the candidate pixels that has an optimal matching cost among the matching costs of the candidate pixels. For example, the stereo matching apparatus determines, to be a pixel corresponding to each reference pixel, a candidate pixel having a lowest matching cost. The stereo matching apparatus determines depth information based on camera parameters and a disparity, which is a location difference between the reference pixel and the pixel corresponding to the reference pixel. The camera parameters may include, for example, a camera focal distance, a camera pixel pitch, and a camera baseline. The calculated depth information is used to obtain a depth map.

According to an example, reducing a calculation or computational complexity while maintaining a high accuracy may be achieved by extracting features from different view images using a neural network model-based feature extractor, and determining a matching cost through a simple operation without using a neural network model. Further, performing stereo matching more rapidly and reducing necessary resources may also be achieved.

Figure 4:
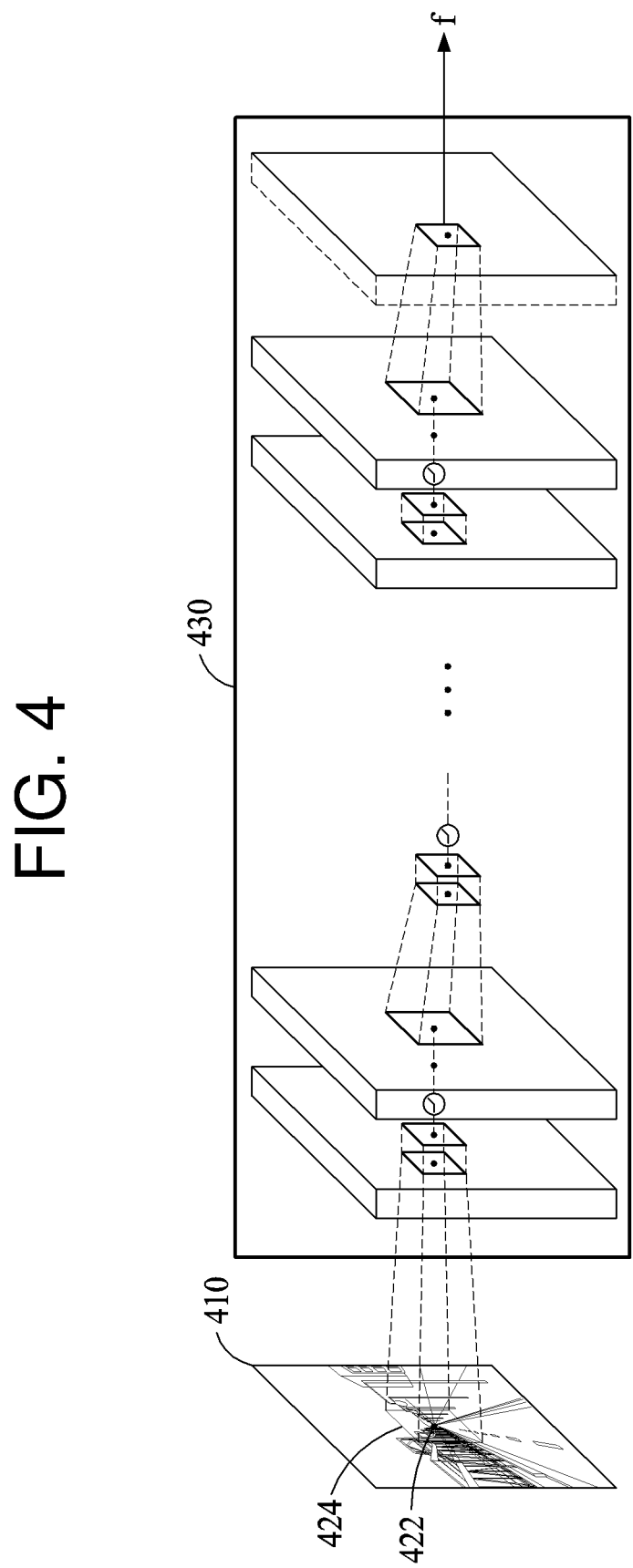
FIG. 4 is a diagram illustrating an example of a structure of a neural network model-based feature extractor.

FIG. 4 is a diagram illustrating an example of a structure of a neural network model-based feature extractor.

Referring to FIG. 4, information of a patch region 424 centered on a pixel 422 of a view image 410 is input to a neural network model-based feature extractor 430, and the feature extractor 430 outputs a feature vector f corresponding to the pixel 422 based on the input information of the patch region 424. A neural network model that embodies the feature extractor 430 may have a structure in which a convolution layer and a rectified linear unit (ReLU) layer are repetitively connected. For example, the neural network model has a structure in which a first convolution layer and a first ReLU layer are connected, a second convolution layer is connected to the first ReLU layer, and a second ReLU layer is connected to the second convolution layer. The convolution layer performs a convolution filtering on input values, and the ReLU layer discards a negative value from the input values and transfers a positive value to a subsequent layer.

In greater detail, the neural network model that embodies the feature extractor 430 may include N sets of the convolution layer and the rectified linear unit (ReLU) layer. Within each of the N sets, an input of the rectified linear unit (ReLU) layer is connected to an output of the convolution layer. The N sets are connected in series so that the convolution layer of a first set of the N sets has an input connected to an input of the neural network model, the convolution layer of each of a second set through an N-th set of the N sets has an input connected to an output of the rectified linear unit (ReLU) layer of a previous one of the N sets, and the rectified linear unit (ReLU) layer of the N-th set of the N sets has an output connected to an output of neural network model.

A neural network model-based feature extractor described with reference to FIGS. 1 through 4 may be used to estimate transformation parameters, such as, for example, a camera movement parameter and a pose transformation parameter, using images obtained at different times. The transformation parameters may need to be estimated because a time interval may be present between the images and a camera or an object may move during the time interval. A method of estimating such transformation parameters using the feature extractor will be described in detail with reference to FIGS. 5 and 6.

Figure 5:
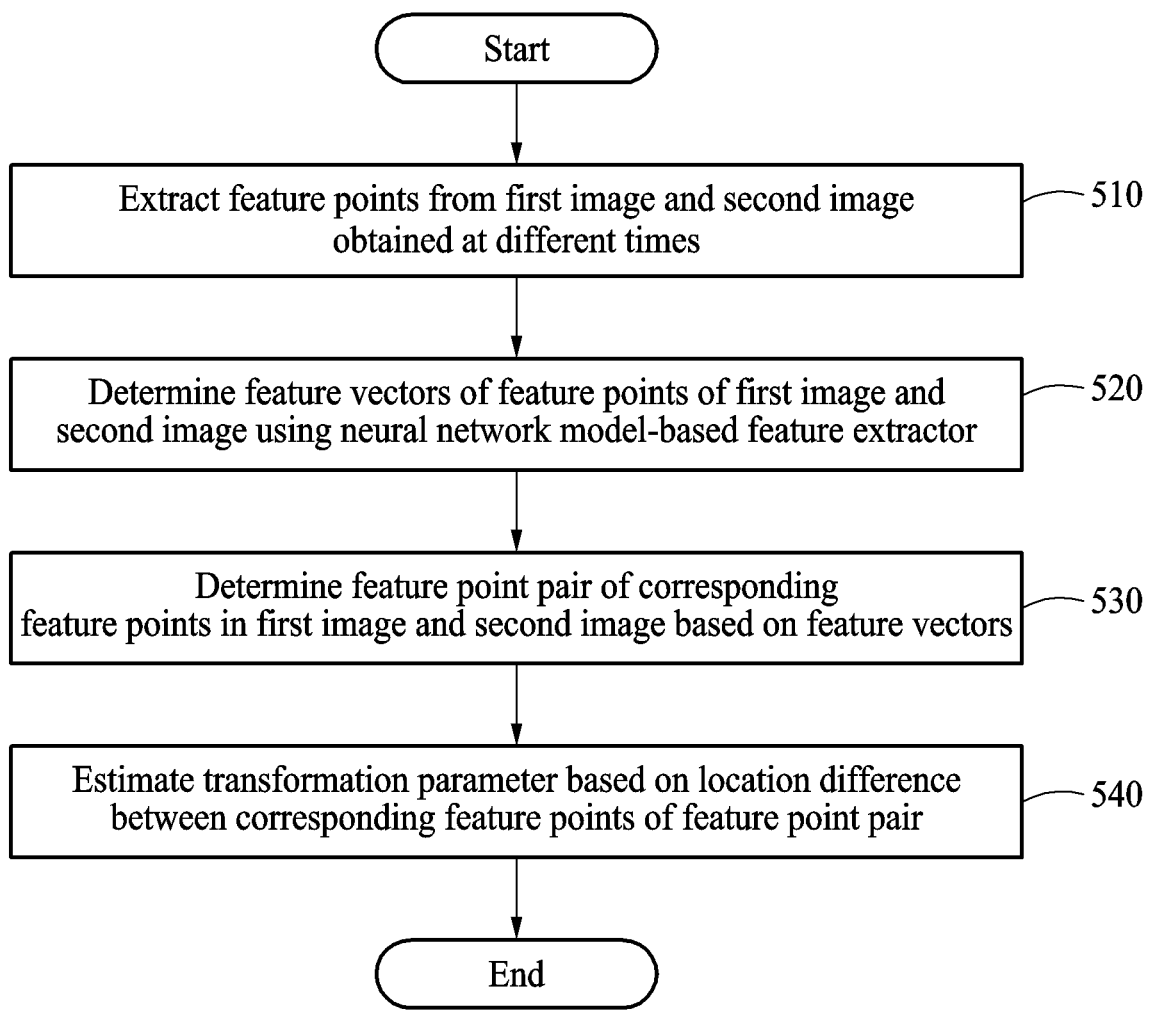
FIG. 5 is a flowchart illustrating an example of a transformation parameter estimating method.

FIG. 5 is a flowchart illustrating an example of a transformation parameter estimating method. The transformation parameter estimating method described hereinafter with reference to FIG. 5 may be performed by an image processing apparatus 700 to be described with reference to FIG. 7.

Referring to FIG. 5, in operation 510, the image processing apparatus extracts feature points from a first image and a second image obtained at different times. For example, the first image is obtained at a first time, and the second image is obtained at a second time, which is subsequent to the first time. The image processing apparatus extracts, as the feature points, an edge region and a corner region based on intensity information, color information, or gradient information of pixels of each of the first image and the second image, or a combination of any two or more thereof.

In one example, the image processing apparatus extracts the feature points from the first image and the second image using, for example, a Harris corner detection, a scale-invariant feature transform (SIFT), and a features from accelerated segment test (FAST). For example, the image processing apparatus extracts a local feature of an image using SIFT. SIFT may be used to extract a feature point as a feature representing a characteristic of a local gradient distribution around the feature point. SIFT may divide a patch region around the feature point into 4×4 blocks and determine a histogram associated with gradient orientations and gradient magnitudes of pixels included in each block. SIFT may then connect in series bin values of the determined histogram to obtain a 128-dimensional vector.

In operation 520, the image processing apparatus determines a first feature vector of each of feature points of the first image and a second feature vector of each of feature points of the second image using a neural network model-based feature extractor. Information about a patch region including a feature point of the first image is input to the feature extractor, and the feature extractor determines a feature vector corresponding to the feature point of the first image based on the input information. Similarly, information about a patch region including a feature point of the second image is input to the feature extractor, and the feature extractor determines a feature vector corresponding to the feature point of the second image based on the input information.

In operation 530, the image processing apparatus determines a feature point pair of corresponding feature points in the first image and the second image based on the first feature vector and the second feature vector. Using the first feature vector and the second feature vector, the image processing apparatus determines, among the feature points of the second image, a feature point of the second image that is closest to a feature point of the first image. For example, as described above, the image processing apparatus calculates a vector distance, for example, a Euclidean distance, between the first feature vector and the second feature vector, and determines the feature point pair of corresponding feature points in the first image and the second image based on the calculated vector distance. The image processing apparatus determines, to be a feature point corresponding to a reference feature point of the first image, a candidate feature point having a smallest vector distance from the reference feature point among candidate feature points of the second image.

In another example, the image processing apparatus additionally performs an outlier removal process. The outlier removal process may be used to improve accuracy in matching feature points by identifying a certain feature point pair that does not satisfy a predetermined rule. For example, in a case that a vector distance between a reference feature point and a candidate feature point is greater than a threshold value, although the vector distance is less than other vector distances between other candidate feature points and the reference feature point, the image processing apparatus determines that the candidate feature point does not correspond to the reference feature point.

In operation 540, the image processing apparatus estimates a transformation parameter based on a location difference between the corresponding feature points of the feature point pair. The image processing apparatus estimates a transformation matrix based on location information of feature point pairs of corresponding feature points that are determined to correspond to each other in the first image and the second image. The location information is represented by a matrix. By applying a matrix operation, the transformation matrix that is used to estimate a transformation relationship between the first image and the second image may be calculated.

Figure 6:
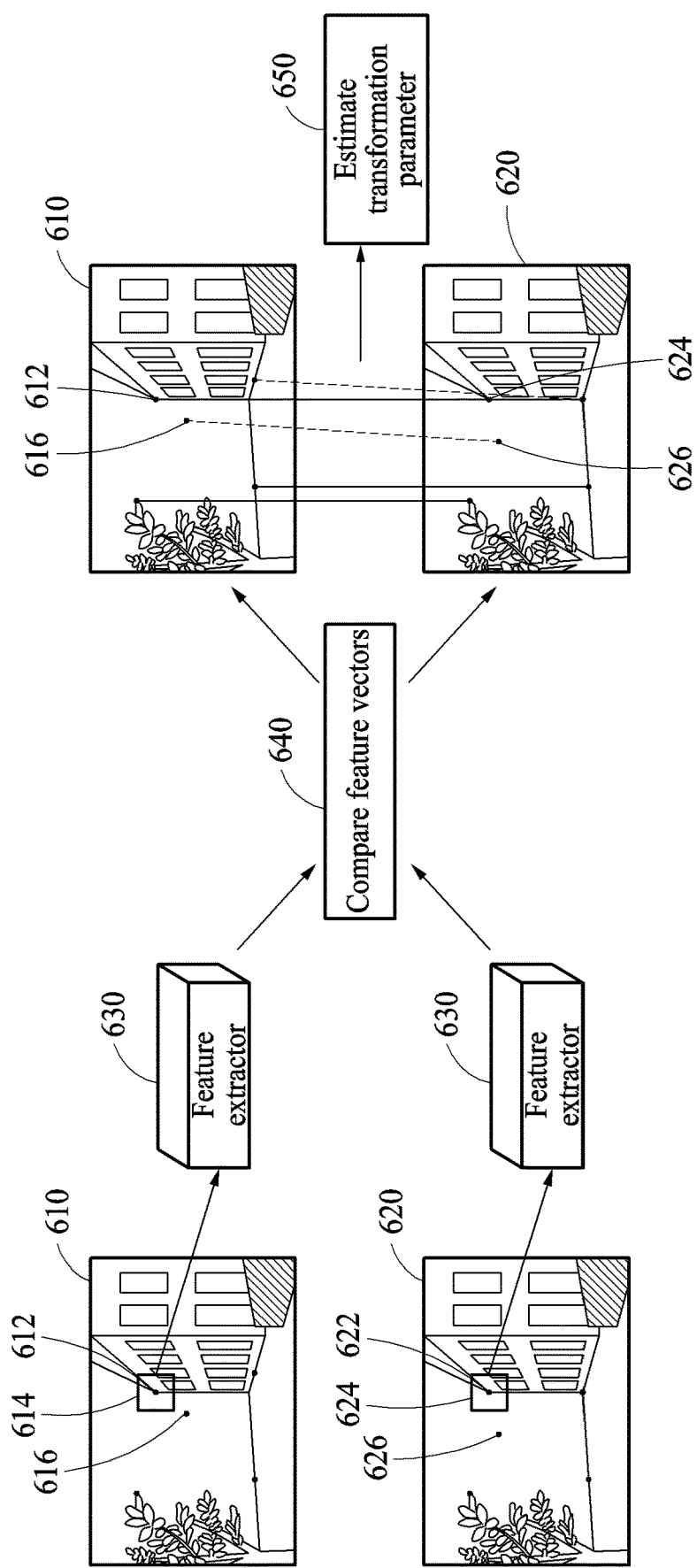
FIG. 6 is a diagram illustrating an example of a transformation parameter estimating method.

FIG. 6 is a diagram illustrating an example of a transformation parameter estimating method.

Referring to FIG. 6, an image processing apparatus extracts first feature points, for example, a first feature point 612 and a first feature point 616, from a first image 610, and extracts second feature points, for example, a second feature point 622 and a second feature point 626, from a second image 620. The image processing apparatus extracts a feature point using any of various feature point extracting methods. Information about a patch region including a feature point is input to a neural network model-based feature extractor 630, and the feature extractor 630 outputs a feature vector corresponding to the feature point. For example, as illustrated in FIG. 6, intensity information, color information, or gradient information of pixels included in a patch region 614, or a combination of any two or more thereof, is input to the feature extractor 630 as information about the patch region 614 centered on the first feature point 612 of the first image 610, and the feature extractor 630 outputs a feature vector corresponding to the first feature point 612. The feature extractor 630 repetitively performs such a method on each of the first feature points extracted from the first image 610 to determine a feature vector corresponding to each of the first feature points of the first image 610.

Similarly, information about a patch region 624 centered on the second feature point 622 of the second image 620 is input to the feature extractor 630, and the feature extractor 630 outputs a feature vector corresponding to the second feature point 622. The feature extractor 630 repetitively performs such a method on each of the second feature points extracted from the second image 620 to determine a feature vector corresponding to each of the second feature points of the second image 620.

In operation 640, the image processing apparatus compares the feature vectors of the first feature points and the feature vectors of the second feature points, and determines a feature point pair of corresponding feature points. In one example, the image processing apparatus calculates a vector distance between the feature vectors and determines a feature point pair having a smallest vector distance to be the feature point pair of the corresponding feature points in the first image 610 and the second image 620.

The image processing apparatus additionally performs an outlier removal process after determining the feature point pair. In one example, the image processing apparatus excludes, from a set of feature point pairs, a feature point pair having a vector distance greater than or equal to a threshold value among feature point pairs determined between the first image 610 and the second image 620. For example, as illustrated in FIG. 6, a vector distance between the feature vector of the first feature point 612 and the feature vector of the second feature point 622 is less than the threshold value, and thus a feature point pair of the feature points 612 and 622 continue to be in the set of feature point pairs. However, a vector distance between the feature vector of the first feature point 616 and the feature vector of the second feature point 626 is greater than the threshold value, and thus a feature point pair of the feature points 616 and 626 is removed from the set of feature point pairs.

In operation 650, after the outlier removal process is performed, the image processing apparatus estimates a transformation parameter based on a location difference between the corresponding feature points of the feature point pair included in the set of feature point pairs. The estimated transformation parameter may be used to correct or convert an image. More than one transformation parameter may be estimated, for example, a camera movement parameter and a pose transformation parameter.

Figure 7:
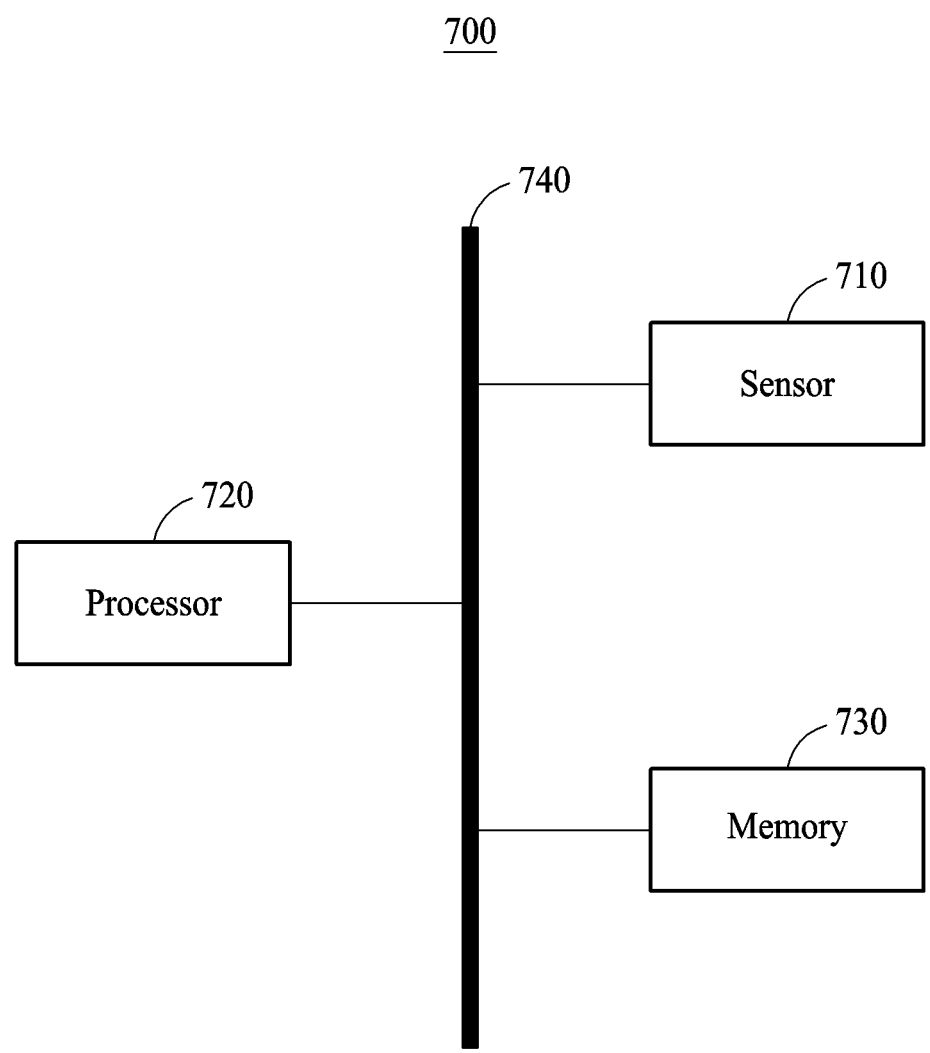
FIG. 7 is a diagram illustrating an example of a configuration of an image processing apparatus.

FIG. 7 is a diagram illustrating an example of a configuration of an image processing apparatus.

Referring to FIG. 7, an image processing apparatus 700 includes a sensor 710, a processor 720, and a memory 730. The sensor 710, the processor 720, and the memory 730 communicate with one another through a communication bus 740.

The sensor 710 captures an image. In one example, the sensor 710 captures a stereo image, and includes a first sensor to capture a first view image and a second sensor to capture a second view image. The first sensor and the second sensor may be, for example, any one or any combination of any two or more of an image sensor, a proximity sensor, and an infrared sensor. The sensor 710 captures the stereo image using a well-known method, for example, a method of converting an optical image to an electrical signal. The sensor 710 transfers, to either one or both of the processor 720 and the memory 730, any one or any combination of any two or more of an obtained color image, an obtained depth image, and an obtained infrared image.

The processor 720 processes an operation associated with stereo matching or transformation parameter estimation. In one example, the processor 720 converts the stereo image to feature maps using a neural network model-based feature extractor, and calculates a matching cost between pixels based on feature vectors included in the feature maps. The processor 720 determines a pixel pair of corresponding pixels in the stereo image based on the calculated matching cost, and estimates depth information based on a disparity between the corresponding pixels of the determined pixel pair.

In another example, the processor 720 extracts feature points from images captured at different times, and determines feature vectors corresponding respectively to the feature points using the feature extractor. The processor 720 determines a feature point pair of corresponding feature points in the images by comparing the feature vectors of the images, and estimates a transformation parameter based on location information of the determined feature point pair of corresponding feature points.

The processor 720 performs at least one operation described with reference to FIGS. 1 through 6, and thus a more detailed and repeated description is omitted here for brevity. The processor 720 executes instructions or programs, and controls the image processing apparatus 700.

The memory 730 stores information and results used in the stereo matching or the transformation parameter estimation. In addition, the memory 730 stores computer-readable instructions. When the computer-readable instructions stored in the memory 730 are executed by the processor 720, the processor 720 performs at least one operation described above.

The image processing apparatus 700 receives a user input, or outputs an image and a processing result through an input and/or output device (not shown). In addition, the image processing apparatus 700 is connected to an external device, for example, a personal computer (PC) and a network, through a communication device (not shown), and exchanges data with the external device.

Figure 8:
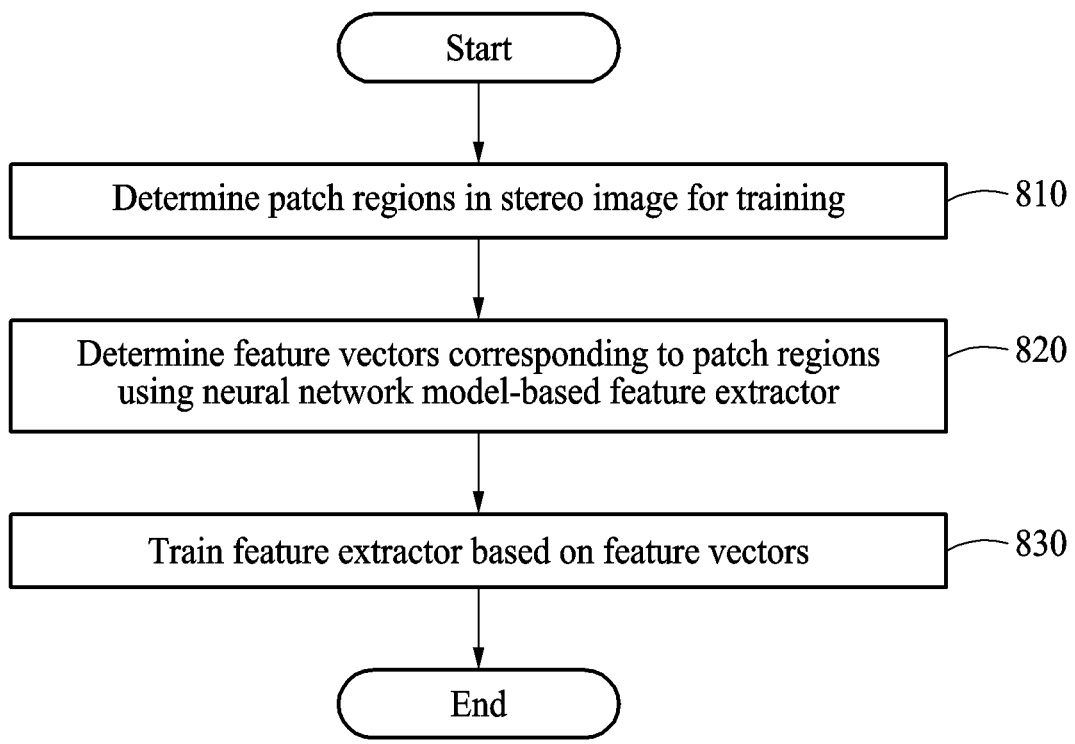
FIG. 8 is a flowchart illustrating an example of a training method of a feature extractor.

FIG. 8 is a flowchart illustrating an example of a training method of a feature extractor.

A training method to be described hereinafter with reference to FIG. 8 may be performed by a training apparatus, and may be performed to train a feature extractor that may be used in the examples described herein. The training includes updating parameters of a neural network model embodying the feature extractor so that the feature extractor outputs a more correct result. In one example, the training method is used to train the feature extractor offline using a relationship between corresponding patch regions of different view images.

Referring to FIG. 8, in operation 810, the training apparatus determines patch regions in a stereo image for training. The training apparatus determines patch regions centered on pixels in each of a first view image and a second view image. In operation 820, the training apparatus determines feature vectors corresponding to the patch regions using a neural network model-based feature extractor. Information about a patch region is input to the feature extractor, and the feature extractor outputs a feature vector of a central pixel of the patch region.

In operation 830, the training apparatus trains the feature extractor based on the determined feature vectors. In the training, corresponding patch regions in the first view image and the second view image are already known, and thus the training apparatus updates parameters of a neural network model so that the feature extractor outputs similar feature vectors for the corresponding patch regions. In addition, the training apparatus updates parameters of the neural network model so that a difference between feature vectors for patch regions that do not correspond to each other in the first view image and the second view image increases. Such an updating process includes adjusting connection weights between artificial neurons included in the neural network model.

In one example, the training apparatus adjusts the connection weights between the artificial neurons through backpropagation learning. The backpropagation learning is used to adjust the connection weights between the artificial neurons to reduce a loss by estimating the loss through forward computation with respect to given training data, and propagating the estimated loss backwards starting from an output layer of the neural network model to a lower layer. The training apparatus defines an objective function to measure whether currently set connection weights are close to optimal values, and continuously adjusts the connection weights until the objective function obtains a satisfactory result.

Figure 9:
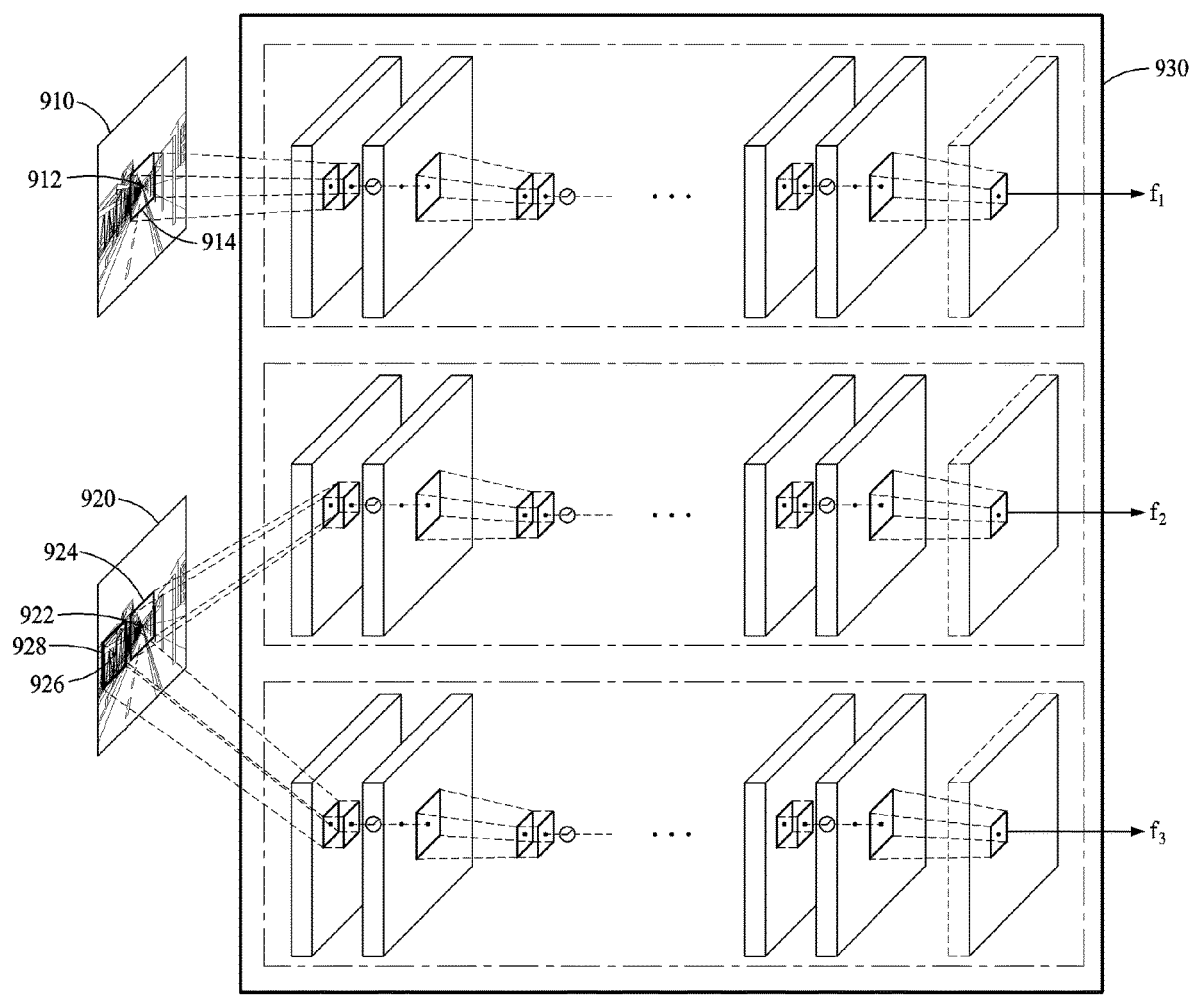
FIG. 9 is a diagram illustrating another example of a training method of a feature extractor.

FIG. 9 is a diagram illustrating another example of a training method of a feature extractor.

Referring to FIG. 9, a training apparatus trains a neural network model-based feature extractor 930 using a triplet neural network model. A neural network model forming the feature extractor 930 is configured by a triplet neural network model sharing three neural network models and parameters. Each of the three neural network models may have a same structure as the neural network model-based feature extractor 430 illustrated in FIG. 4.

In one example, as illustrated in FIG. 9, to a first neural network model, information about a reference patch region 914 centered on a reference pixel 912 included in a first view image 910 is input. To a second neural network model, information about a true candidate patch region 924 centered on a true candidate pixel 922 included in a second view image 920 is input. To a third neural network model, information about a false candidate patch region 928 centered on a false candidate pixel 926 included in the second view image 920 is input. The true candidate patch region 924 is a patch region for detection of an inlier, which is used to determine a true disparity. In contrast, the false candidate patch region 928 is a patch region for detection of an outlier, which is used to effectively identify a false disparity. For example, in a case that 128 candidate patch regions are present, one candidate patch region is a patch region for detection of an inlier, and the remaining 127 candidate patch regions are patch regions for detection of an outlier.

Feature vectors output from the first, second, and third neural network models are referred to as $f_1$, $f_2$, and $f_3$, respectively. The training apparatus calculates a feature vector distance $d_1$ between $f_1$ and $f_2$, and a feature vector distance $d_2$ between $f_1$ and $f_3$. The training apparatus trains the triplet neural network model forming the feature extractor 930 so that the feature vector distance $d_1$ has a value close to 0, that is, is substantially equal to 0, and the feature vector distance $d_2$ has a high value. The training apparatus may train the first, second, and third neural network models of the triplet neural network model using the training method illustrated in FIG. 8.

By training a feature extraction process of the feature extractor 930 through the triplet neural network model illustrated in FIG. 9, the feature extractor 930 may be effectively trained to allow a matching cost associated with a true patch region, or an inlier, which actually corresponds to a reference patch region, to be less than a matching cost associated with a false patch region, or an outlier, which does not correspond to the reference patch region.

In one example, one of the three neural network models included in the feature extractor 930 that is trained may be used in a feature extraction process described with reference to FIGS. 1 through 7.

The stereo matching apparatus 100 and the neural network model-based feature extractor in FIG. 1, the neural network model-based feature extractors 330 in FIG. 3, the neural network model-based feature extractor in FIG. 4, the neural network model-based feature extractors 630 in FIG. 6, the sensor 710, the processor 720, the memory 730, and the communication bus 740 in FIG. 7, and the neural network model-based feature extractor 930 in FIG. 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-6, 8, and 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A stereo matching method comprising:
    obtaining a first feature map associated with a first view image comprising a reference pixel and a second feature map associated with a second view image comprising candidate pixels using a neural network model-based feature extractor;
    determining respective matching costs between the reference pixel of the first view image and the candidate pixels of the second view image based on the first feature map and the second feature map obtained from the neural network model-based feature extractor; and
    determining a pixel corresponding to the reference pixel among the candidate pixels based on the determined matching costs,
    wherein the determining of the respective matching costs comprises:
        determining vector distances between a feature vector of the reference pixel included in the first feature map and respective feature vectors of the candidate pixels included in the second feature map, wherein the candidate pixels are pixels within a search range located on a line comprising a point in the second view image corresponding to the reference pixel of the first view image;
        determining an initial matching cost based on a vector distance among the respective vector distances between the feature vector of the reference pixel and a respective feature vector of a current candidate pixel among the candidate pixels; and
        determining a matching cost among the respective matching costs by adjusting the initial matching cost based on matching cost information associated with another reference pixel adjacent to the reference pixel.

2. The stereo matching method of claim 1, wherein the determining of the pixel comprises determining, to be the pixel corresponding to the reference pixel, a candidate pixel having a lowest matching cost among the candidate pixels.

3. The stereo matching method of claim 1, wherein the obtaining of the first feature map comprises:
    receiving image information of the first view image as an input,
    determining the feature vector of the reference pixel based on the input image information, and
    obtaining the first feature map based on the feature vector of the reference pixel.

4. The stereo matching method of claim 1, wherein the obtaining of the second feature map comprises:
    receiving image information of the second view image as an input,
    determining the respective feature vectors of the candidate pixels based on the input image information, and
    obtaining the second feature map based on the respective feature vectors of the candidate pixels.

5. The stereo matching method of claim 1, wherein the obtaining of the first feature map and the second feature map comprises:
    obtaining the first feature map based on a patch region of the first view image, and
    obtaining the second feature map based on patch regions of the second view image.

6. The stereo matching method of claim 5, wherein the obtaining of the first feature map comprises:
    receiving, as an input, information of a patch region comprising the reference pixel of the first view image,
    determining the feature vector of the reference pixel based on the input information of the patch region, and
    determining the first feature map based on the feature vector of the reference pixel.

7. The stereo matching method of claim 6, wherein the information of the patch region comprises any one or any combination of any two or more of intensity information, color information, and gradient information of pixels included in the patch region comprising the reference pixel.

8. The stereo matching method of claim 5, wherein the obtaining of the second feature map comprises:
    receiving, as an input, information of patch regions respectively comprising the candidate pixels of the second view image,
    determining the respective feature vectors of the candidate pixels based on the input information of the patch regions, and
    obtaining the second feature map based on the respective feature vectors of the candidate pixels.

9. The stereo matching method of claim 8, wherein the information of the patch regions comprises any one or any combination of any two or more of intensity information, color information, and gradient information of pixels included in the patch respectively comprising the candidate pixels.

10. The stereo matching method of claim 1, wherein the first feature map comprises a feature vector of each of pixels included in the first view image, and
    the second feature map comprises a feature vector of each of pixels included in the second view image.

11. The stereo matching method of claim 1, further comprising determining depth information based on a disparity between the reference pixel and the pixel corresponding to the reference pixel.

12. A non-transitory computer-readable medium storing instructions that, when executed by a processor, cause the processor to perform the method of claim 1.

13. A stereo matching method comprising:
    extracting a first feature vector of a reference pixel included in a first view image and respective second feature vectors of each of candidate pixels included in a second view image using a neural network model-based feature extractor; and determining a pixel corresponding to the reference pixel among the candidate pixels based on the first feature vector and the second feature vectors obtained from the neural network model-based feature extractor, wherein determining comprises:
  determining a respective vector distance between the first feature vector and each of the second feature vectors, wherein the candidate pixels are pixels within a search range located on a line comprising a point in the second view image corresponding to the reference pixel of the first view image;
  determining an initial matching cost based on a vector distance among the respective vector distances between the first feature vector and a respective second feature vector of a current candidate pixel among the candidate pixels;
  determining a matching cost among respective matching costs by adjusting the initial matching cost based on matching cost information associated with another reference pixel adjacent to the reference pixel; and
  determining the pixel corresponding to the reference pixel among the candidate pixels based on the respective matching costs.

14. An image processing apparatus comprising:
a processor configured to:
  obtain a first feature map associated with a first view image comprising a reference pixel and a second feature map associated with a second view image comprising candidate pixels using a neural network model-based feature extractor,
  determine respective matching costs between the reference pixel of the first view image and the candidate pixels of the second view image based on the first feature map and the second feature map obtained from the neural network model-based feature extractor, and
  determine a pixel corresponding to the reference pixel among the candidate pixels based on the determined matching costs, wherein the processor is further configured to:
  determine vector distances between a feature vector of the reference pixel included in the first feature map and respective feature vectors of the candidate pixels included in the second feature map, wherein the candidate pixels are pixels within a search range located on a line comprising a point in the second view image corresponding to the reference pixel of the first view image, and
  determine an initial matching cost based on a vector distance among the respective vector distances between the feature vector of the reference pixel and a respective feature vector of a current candidate pixel among the candidate pixels; and
  determine a matching cost among the respective matching costs by adjusting the initial matching cost based on matching cost information associated with another reference pixel adjacent to the reference pixel.

15. The method of claim 1, wherein the vector distances are Euclidian distances.

16. The method of claim 1, wherein the determining of the pixel corresponding to the reference pixel comprises determining the pixel corresponding to the reference pixel from the search range of a resultant matching cost volume of the determined respective matching costs.

\* \* \* \* \*